(12) United States Patent
Luckowski et al.

(10) Patent No.: US 6,627,839 B1
(45) Date of Patent: Sep. 30, 2003

(54) DUAL-TORCH GAS METAL ARC PULSE WELDING FOR OVERLAY APPLICATIONS

(76) Inventors: Stephen Luckowski, 187 Bay Ave., Bloomfield, NJ (US) 07003; George Scullin, R.R. Box 1037A, Bartonsville, PA (US) 18321; Roger P. Stanton, R.R. Box 1408, Stroudsburg, PA (US) 18360

(*) Notice: Subject to any disclaimer, the term of this patent is extended or adjusted under 35 U.S.C. 154(b) by 0 days.

(21) Appl. No.: 09/784,412

(22) Filed: Feb. 14, 2001

Related U.S. Application Data

(60) Provisional application No. 60/182,411, filed on Feb. 14, 2000.

(51) Int. Cl.[7] .................................................. B23K 9/04
(52) U.S. Cl. ................................ 219/76.14; 219/137 PS
(58) Field of Search ........................... 219/76.12, 76.14, 219/130.51, 137 PS, 137 R, 74

(56) References Cited

U.S. PATENT DOCUMENTS

| | | | | |
|---|---|---|---|---|
| 2,299,747 A | * | 10/1942 | Harter | 219/76.12 |
| 2,681,970 A | * | 6/1954 | Koopman | 219/74 |
| 2,813,190 A | * | 11/1957 | Felmley, Jr. | 219/76.14 |
| 2,841,688 A | * | 7/1958 | Andreassen et al. | 219/76.14 |
| 2,862,101 A | * | 11/1958 | Klinke | 219/137 R |
| 3,549,856 A | * | 12/1970 | Saenger, Jr. | 219/137 R |
| 4,806,735 A | * | 2/1989 | Ditschun et al. | 219/130.5 |

FOREIGN PATENT DOCUMENTS

JP          59-16680       *   1/1984   ............ 219/130.51

* cited by examiner

*Primary Examiner*—Clifford C. Shaw
(74) *Attorney, Agent, or Firm*—Robert C. Beam; John F. Moran; Michael C. Sachs

(57) ABSTRACT

An apparatus and process are shown for the application of welded metal overlay deposits to cylindrical substrates for use in wear, chemical, and temperature resistance. More specifically, this apparatus permits the application of welded overlay rotating bands to steel and other alloy artillery projectiles having narrow sidewall thick nesses.

1 Claim, 2 Drawing Sheets

DUAL-TORCH GAS METAL ARC PULSE WELDING FOR OVERLAY APPLICATIONS

CROSS REFERENCE TO RELATED APPLICATIONS

This Application claims priority of United States Provisional Patent Application No. 60/182,411, filed Feb. 14, 2000.

STATEMENT REGARDING FEDERALLY SPONSORED RESEARCH OR DEVELOPMENT

The United States of America has certain rights and licenses in this invention.

BACKGROUND OF THE INVENTION

1. Field of the Invention

The present invention is related to a dual-torch gas metal arc pulse-welding apparatus for use in metal overlay applications. In particular, the present invention relates to an apparatus and process for the application of welded metal overlay deposits to cylindrical substrates for use in wear, chemical, and temperature resistance. More specifically, this invention relates to the application of welded overlay rotating bands to steel and other alloy artillery projectiles.

2. Description of Related Art

A conventional machine is known which employs a single torch gas metal arc-welding torch for overlay applications. Specifically, such a machine has been employed for the application of a gilding metal rotating band to artillery projectiles on the outside diameter of cylindrical metal parts. The conventional machine uses a single gas metal arc-welding torch powered by a standard gas metal arc welding power source. Welding is performed in the direct current electrode positive mode of welding, where the electrode is a continuously-fed electrically-charged wire as in conventional gas metal arc welding Aprocesses. The torch is mounted on an oscillating head, where the oscillating parameters include oscillation frequency and width, and can be controlled as a function of time and/or angular position. In addition to the gas metal arc welding torch, a non-electrically charged auxiliary wire is positioned on the oscillating head such that it maintains a strict alignment with the electrically-charged electrode and maintains a certain variable geometric relationship as shown in FIG. 1. Alignment of the electrode and auxiliary wires is critical and is key to the process. Rotary cam-type wire straighteners are used on both the electrode and auxiliary wire feed systems in order to maintain wire alignment. The welding torch and auxiliary wire are so mounted on the oscillating head that the head may be moved in an x, y or z direction. The welding torch and the auxiliary wire are mounted so that the torch angle may vary from 0 degrees (perpendicular) to 20 degrees, and that the angle between the welding torch and the auxiliary wire is also variable.

In the known process, a continuous overlay deposit is performed around the entire circumference of the substrate part in a single welding sequence. A substrate, such as a metal cylinder, rotates beneath the oscillating torch at a programmable rotation speed, and an overlay deposit of a variable width is applied through the manipulation of parameters, which may include rotational speed of the substrate part, oscillation frequency, electrode wire feed speed, auxiliary wire feed speed, torch height (z), torch location (x), torch off-center position (y), torch angle, and the angle of the auxiliary wire to the torch. A cooling water nozzle is used on the interior of the metal cylinder that follows the torch, and covers the inside surface of the cylinder with a water spray over the width of the torch oscillation. In the known process, electrode wire diameters of 0.035" through ⅛" and auxiliary wire diameters of 0.035" to ³⁄₃₂" have been used. Typically, electrode and auxiliary wire diameters are matching, but this is not always necessary, or even desired. Overlay deposits of brass (gilding metal), silicon bronze, copper, nickel, iron, monel, titanium, and stainless steel have been made in this manner.

In most instances, the composition of the electrode and the auxiliary wire are the same, but this may not always be the case. In the case of gilding deposits where the metal deposit is a brass alloy, for example, the electrode is typically copper and the auxiliary wire is a brass alloy, because the zinc contained in the brass alloy cannot be transferred through the welding arc. In monel, a copper electrode may be used in conjunction with a nickel auxiliary wire. This conventional process is capable of achieving low dilution rates and minimal weld penetration on substrates that are both ferrous and non-ferrous alloys. Dilution rates less than 2% have been achieved in the welding of copper alloys, and penetration of less than 0.030" has been achieved in the welding of nickel alloys. Welding has been performed on a variety of different materials, to include alloy steels, plain carbon steels, high carbon steels, ductile iron, maraging steels, and titanium. Cylinder sizes have typically ranged from 0.5 inches to 6 inches in diameter, and wall thickness have ranged from ³⁄₁₆" to ¾". The conventional process, however, has shown unacceptable penetration (greater than 0.030") in wall thickness less than ³⁄₁₆".

BRIEF SUMMARY OF THE INVENTION

OBJECT OF THE INVENTION

It is an object of the present invention to provide a dual torch gas metal arc pulse welding apparatus that is capable of applying a metal overlay to cylindrical metal bases with narrower side wall, without unacceptable penetration.

It is a further object of the present invention to provide a dual torch gas metal arc pulse welding apparatus that is capable of the more efficient deposition of a metal overlay to cylindrical metal bases.

It is a still further object of the present invention to provide a process in which a metal overlay may be applied to cylindrical metal bases with narrow sidewalls, without unacceptable penetration.

The other objects, features and advantages of the present invention will become more apparent in light of the following detailed description of the preferred embodiment thereof.

SUMMARY OF THE INVENTION

According to one embodiment of the present invention, there is disclosed an apparatus for the overlay of metal on a revolving cylindrical metal base by welding, with minimal penetration, said apparatus comprising:

a first gas metal arc pulse welding apparatus comprising a primary wire direct current electrode capable of positive pulse welding, and an electrically-neutral auxiliary wire, a second gas metal arc pulse welding apparatus comprising a primary direct current electrode capable of positive pulse welding, and an electrically-neutral auxiliary wire, and, a cylindrical metal base, which is negatively-charged and rotated in relation to, said first and second gas metal arc pulse welding apparatuses.

According to another embodiment of the present invention, there is disclosed a process for the application of a metal band to a cylindrical metal base, with a dual gas metal arc pulse welding apparatus, which process comprises the steps of:

a. weld arc initiation;
b. weld ramp;
c. weld;
d. initial weld stop;
e. weld overlap; and,
f. arc termination.

DETAILED DESCRIPTION OF THE INVENTION

The present invention discloses the use of a dual torch gas metal arc welder and utilizes all of the features of a single torch apparatus employed in the conventional process. However, the use of dual torches, in a two-torch configuration, has the effect of reducing penetration in the applications described above, and has been shown to achieve acceptable penetration in wall thickness less than ³⁄₁₆".

Figure 1:
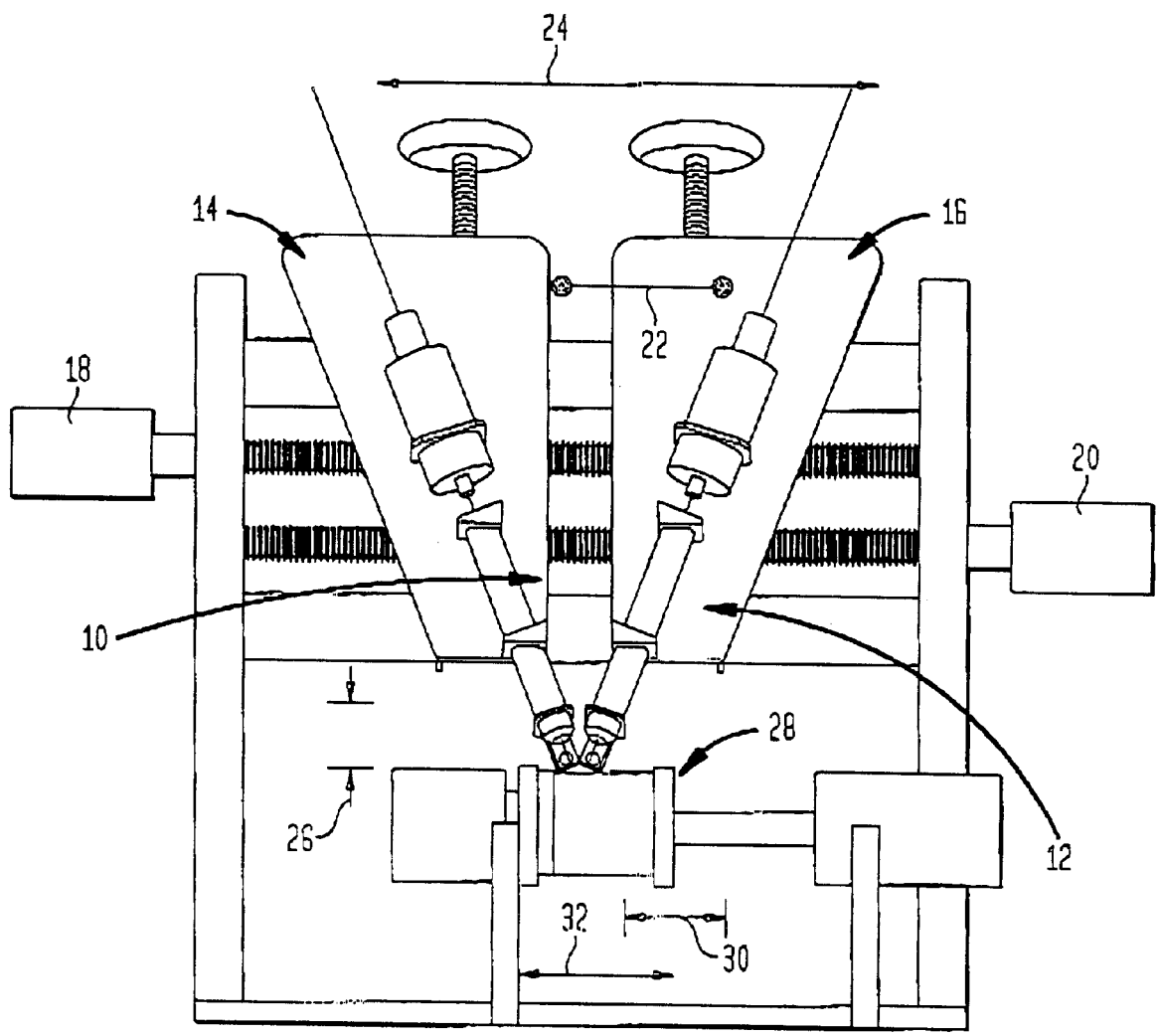
FIG. 1 shows the configuration of the dual torch gas metal arc pulse welding apparatus of the present invention.

The configuration of the dual torch gas metal arc pulse welding apparatus is shown in FIG. 1. Torches 10 and 12 are placed on oscillating weld heads 14 and 16 driven by independent servo motors 18 and 20 such that torch oscillation frequency (speed), oscillation width, and oscillation dwell time can be independently adjusted for each torch. A mechanical linkage 22 is so fixed to each weld head 14 and 16 such that torch 10 and 12 can oscillate in unison in a "master-slave" relationship.

The angle 24 between torch 10 and 12 is adjustable, as is the height 26 of the torches 10 and 12 above the substrate 28 and the position 30 of the torches 10 and 12 along the length 32 of the substrate 28.

Figure 2:
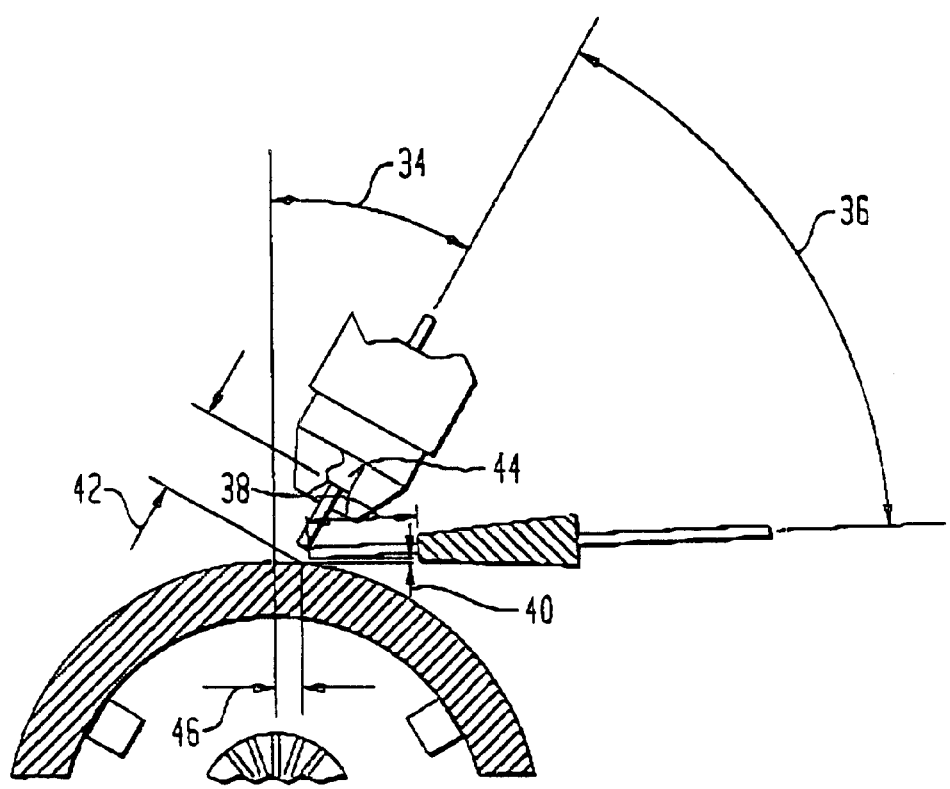
FIG. 2 shows greater detail of the configuration of the dual torch gas metal arc pulse welding apparatus of the present invention.

Further, as can be seen more clearly in FIG. 2, each of torches 10 and 12 has an adjustable geometric relation. Each torch 10 and 12 is adjustable in torch angle 34 relative to the perpendicular axis of the substrate 28. Each torch 10 and 12 is adjustable with respect to the auxiliary wire through angle 36 and the distance 38 and height 40 of the auxiliary wire guide tip is adjustable with respect to the substrate 28.

Further, the position of each torch 10 and 12 is adjustable with respect to the perpendicular axis of substrate 28 through the horizontal axis. As in the conventional process, the substrate 28, typically a metal cylinder, rotates beneath the oscillating torches at a programmable rotation speed, and an overlay deposit of a variable width is applied. The qualities of the application are controlled through the manipulation of machine parameters that include: part rotation speed, oscillation frequency, electrode wire feed speed, auxiliary wire feed speed, torch height 42, torch location 44, torch off-center position 46, torch angle 34, and auxiliary wire to torch angle 36.

In the present invention, the weld deposit may be further affected by control of the preferred weld mode, Direct Current Electrode Positive Pulse Welding. In the Direct Current Electrode Positive Pulse Welding mode, the weld deposit may also be controlled through the manipulation of pulse welding parameters for each torch. At a given electrode wire feed rate the control parameters include: peak current, background current, pulse width, pulse frequency, trim, and pulse waveform shape.

The dual torch gas metal arc pulse welding apparatus of the present invention is programmable using a programmable logic controller that controls a series of weld steps. This series of steps can be linked in series to create a weld schedule. Each step of the weld schedule is programmable in terms of substrate angular position or time for the following parameters: substrate rotation speed (RPM), individual torch oscillation frequency (cycles per minute), individual torch dwell time (seconds), dual torch oscillation frequency (cycles per minute), dual torch dwell time (seconds), electrode wire feed rate for torches 10 and 12 (typically in inches per minute), auxiliary wire feed rate for torches 10 and 12 (typically in inches per minute), voltage for torches 10 and 12, peak current for torches 10 and 12, background current for torches 10 and 12, pulse frequency (pulses per second) for torches 10 and 12, pulse width for torches 10 and 12, trim for torches 10 and 12, and shielding gas flow rate for torches 10 and 12.

A typical weld schedule may consist of 12 to 15 steps, where six stages of welding are addressed in order to perform a continuous weld deposit around the entire circumference of a substrate 28 over a given width. The six welding stages include: weld arc initiation, weld ramp, weld, initial weld stop, weld overlap, and arc termination.

In the weld arc initiation, torch 10 and torch 12 may be oscillating in unison, or separately, or may even be held stationary, when a set of welding parameters is applied. Once the arc starts, a molten puddle develops over an oscillation width. Once the molten puddle develops over an oscillation width, the substrate 28 begins rotating at a controlled rotation speed. The rotation speed depends upon parameters such as wire diameters for electrode wires and auxiliary wires, wire feed rates for said wires, and pulse parameter settings for said electrode wires.

The weld ramp is then established while the substrate 28 is rotated for a small fraction of its entire circumference. The intent of the weld ramp is to produce a small initial weld overlay with certain geometrical features that promote re-melting of the initial deposit upon overlap (full circumferential welding).

After the weld ramp, weld parameters change to those for the weld stage in order to perform the larger fraction of the circumferential weld. As in the weld ramp, the rotation speed of the substrate 28 depends upon parameters such as wire diameters for electrode wires and auxiliary wires, wire feed rates for said wires, and pulse parameter settings for said electrode wires.

Once the substrate 28 has rotated around its entire circumference, and the weld puddle reaches the initial deposit, the substrate 28 stops rotating in order to re-melt the material in the initial deposit and produce a seamless, continuous circumferential weld. This is the weld stop sequence where electrode wire feed rates and pulse parameters as a function of time may be adjusted in order to produce a seamless deposit. In most cases, it is the auxiliary wire feed rate that is stopped in conjunction or just prior to the weld stop.

After the weld stop, the substrate 28 begins to rotate again in order to overlap the initial deposit and to produce a continuous weld. In this overlap sequence, the rotation speed depends upon parameters such as electrode wire feed rate and pulse parameter settings for the electrode wires.

After the overlap sequence, the substrate 28 stops rotation, and the oscillation of each torch stops, and arc is terminated.

Important features in the dual torch gas metal arc pulse welding apparatus of the present invention are in the torch positioning, the type of power supplies, and application of power supplies. In the dual torch gas metal arc pulse welding apparatus, each torch is ideally electrically connected to a separate direct current power supply, and each separate power supply is capable of the necessary power output for pulse welding. The dual torch machine embodies novel features when compared to the conventional process. If this two torch configuration were adopted solely using a combination of single torches of the conventional process, the magnetic fields produced by each of welding electrodes would cause undesirable arc interactions, including arc blow and arc wandering problems, due to the fact that each of the welding electrodes has the same electrical polarity. This would adversely affect the overlay process. In the present invention, the pulsing of either electrode or both simultaneously causes a continuously collapsing magnetic field, effectively eliminating such arc interactions.

In the present invention, dilution is reduced through the use of pulse welding. The invention thus expands the availability of overlay welding to include substrate components with wall thickness less than ³⁄₁₆" and simultaneously increases deposition rate, thereby lowering welding cost. The present invention allows for the use of smaller diameter welding wires to be used than in the conventional process, thus further reducing penetration and increasing deposition rate. The apparatus is capable of welding nickel, stainless steel, and soft iron deposits on thin wall alloy steel projectile bodies, as well as a variety of other materials on cylindrical substrates. The apparatus may incorporate equipment as part of a machine process, which may include: a material handling system, a chucking mechanism, a rotation mechanism, welding torches, two gas metal arc pulse welding power supplies, an oscillating mechanism, wire drives and straighteners, a shielding gas system, a substrate cooling system, and a ventilation system. The machine incorporates PC off-line weld schedule planning, PLC machine control, servo motion control, an operator screen and pendant, and weld power supply/machine control.

Other features, advantages, and specific embodiments of this information will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. An apparatus for the overlay of metal on a revolving cylindrical metal base by welding, with minimal penetration, said apparatus comprising:

a first gas metal arc pulse welding apparatus comprising a primary wire direct current electrode capable of positive pulse welding, and an electrically-neutral auxiliary wire, a second gas metal arc pulse welding apparatus comprising a primary direct current electrode capable of positive pulse welding, and an electrically-neutral auxiliary wire, and, a cylindrical metal base, which is negatively-charged and rotated in relation to, said first and second gas metal arc pulse welding apparatuses.

* * * * *